US012042838B2

(12) United States Patent
Han et al.

(10) Patent No.: US 12,042,838 B2
(45) Date of Patent: Jul. 23, 2024

(54) APPARATUS FOR HOLDING BLANK FOR INCREMENTAL FORMING

(71) Applicants: Hyundai Motor Company, Seoul (KR); Kia Corporation, Seoul (KR)

(72) Inventors: Jul Ki Han, Seongnam-si (KR); Yang Hwan Jeon, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 193 days.

(21) Appl. No.: 17/866,992

(22) Filed: Jul. 18, 2022

(65) Prior Publication Data

US 2023/0070558 A1 Mar. 9, 2023

(30) Foreign Application Priority Data

Sep. 6, 2021 (KR) ........................ 10-2021-0118390

(51) Int. Cl.
*B25B 5/06* (2006.01)
*B21D 22/22* (2006.01)

(52) U.S. Cl.
CPC ................ *B21D 22/22* (2013.01); *B25B 5/06* (2013.01)

(58) Field of Classification Search
CPC .. B25B 5/00; B25B 5/06; B25B 5/064; B25B 5/14
See application file for complete search history.

(56) References Cited

U.S. PATENT DOCUMENTS

| | | | | |
|---|---|---|---|---|
| 5,816,568 | A * | 10/1998 | Fox | B25B 11/02 269/246 |
| 7,959,141 | B2 * | 6/2011 | Makino | G03B 27/62 269/61 |
| 9,700,976 | B2 * | 7/2017 | Gao | B23Q 3/062 |
| 11,806,823 | B2 * | 11/2023 | Takitani | B23Q 1/4857 |
| 2009/0314211 | A1 * | 12/2009 | Du Bois | H01L 21/68742 118/729 |
| 2010/0187740 | A1 * | 7/2010 | Orgeron | E21B 19/155 269/218 |
| 2023/0070558 | A1 * | 3/2023 | Han | B21D 31/005 |

FOREIGN PATENT DOCUMENTS

KR 10-2006-0127806 A 12/2006

* cited by examiner

*Primary Examiner* — Lee D Wilson
(74) *Attorney, Agent, or Firm* — Morgan, Lewis & Bockius LLP

(57) ABSTRACT

An apparatus of holding a blank for incremental forming, includes a blank holder to which a blank is configured to be coupled; a motor configured to provide driving power; an interlocking mechanism engaged to the motor and configured to rectilinearly move the blank holder in a direction perpendicular to a forming surface of the blank in conjunction with an operation of the motor; and a controller configured to control the operation of the motor so that the blank rectilinearly moves in accordance with a position of a forming robot configured for forming the blank.

14 Claims, 6 Drawing Sheets

APPARATUS FOR HOLDING BLANK FOR INCREMENTAL FORMING

CROSS REFERENCE TO RELATED APPLICATION

The present application claims priority to Korean Patent Application No. 10-2021-0118390, filed Sep. 6, 2021, the entire contents of which is incorporated herein for all purposes by this reference.

BACKGROUND OF THE PRESENT DISCLOSURE

Field of the Present Disclosure

The present disclosure relates to an apparatus of holding a blank for incremental forming, which is capable of improving component formability by automatically adjusting a position of a blank in conjunction with a forming position of a robot and fixing the blank depending on a size of the blank.

Description of Related Art

During incremental forming, one surface of a blank (material) is gradually processed by a tool in a state in which the blank is fixed.

Thereafter, the other surface of the blank is gradually processed by the tool so that the two opposite surfaces of the blank are processed without a mold, and the blank has a shape similar to a designed shape.

Such incremental forming utilizes a stationary holder to which two opposite end portions of the blank are fixed.

However, according to the incremental forming technology in the related art, it is difficult to manufacture vehicle components, which may be applied to actual vehicles, due to limitations such as simple shapes (cup shapes or the like), low-strength material (340 or less), forming quality defects, and the like.

That is, the related art may perform only a simple forming process, such as a process of using a single-size holder, a process of manually adjusting a blank height, a process of performing a manual operation for each working step after stopping a robot, and the like.

An incremental forming technology using a robot has been developed to solve these problems. However, a technology associated with a blank holder that automatically operates in conjunction with a forming position of a robot has not been appropriately developed. For the present reason, the position of the blank is manually adjusted depending on the forming position of the robot.

For the present reason, quality is not uniform, and an excessive number of processes is required. Furthermore, the blank holders need to be developed for each blank size in a case in which the blanks have different sizes, which causes excessive development costs.

The information included in this Background of the present disclosure section is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an apparatus of holding a blank for incremental forming, which is configured for automatically adjusting a position of a blank in conjunction with a forming position of a robot.

The present disclosure also aims to provide an apparatus of holding a blank for incremental forming, which is configured for fixing a blank depending on a size of the blank.

Various aspects of the present disclosure are directed to providing an apparatus of holding a blank for incremental forming, the apparatus including: a blank holder to which a blank is configured to be coupled; a motor configured to provide driving power; an interlocking means engaged to the motor and configured to rectilinearly move the blank holder in a direction perpendicular to a forming surface of the blank in conjunction with an operation of the motor; and a controller configured to control the operation of the motor so that the blank rectilinearly moves depending on a position of a forming robot configured for forming the blank.

The interlocking means may include: a plurality of jack nuts penetratively coupled to the blank holder; guide screws fastened to the jack nuts by screw structures, provided to be rotatable about axes of the guide screws, and configured to move the blank holder in an axial direction by rotating; and gear units engaged to the guide screws and configured to transmit the driving power of the motor to the guide screws.

The gear unit may include: a worm wheel fixed to an end portion of a corresponding guide screw and configured to rotate about an axis thereof; and a worm configured to receive the driving power from the motor and engage with the worm wheel to rotate the worm wheel.

The worms for transmitting a rotational force to the guide screws may be disposed at first and second opposite sides of the blank holder, driveshafts may be disposed at two opposite sides of the motor, and the driveshafts and the worms at the two opposite sides may be connected to one another by a bevel gear set so that the driving power of the motor may be equally transmitted to the worms at the two opposite sides.

The blank holder may have a quadrangular shape, the worms may be provided at respective corners of the blank holder, and the worm at the front end portion and the worm at the rear end portion may be connected by a connection shaft so that the driving power of the motor may be equally transmitted to the respective worms.

The bevel gear set may define a reduction gear ratio which is more than one.

The blank holder may include: a holder frame fixed to the jack nuts, including a quadrangular frame shape including a hollow portion at a center portion of the holder frame, and including a rim on which a first surface of the blank is accommodated while covering the hollow portion; a gripper frame coupled to the holder frame while covering a rim portion of a second surface of the blank; and a variable gripper including a shape traversing the inside of the gripper frame and including two opposite end portions coupled to the holder frame while covering one side rim of the second surface of the blank.

The variable gripper may be coupled to the holder frame by moving in a direction perpendicular to a longitudinal direction thereof.

Various aspects of the present disclosure are directed to providing an apparatus of holding a blank for incremental forming, the apparatus including: a blank holder to which a blank is configured to be coupled; a supporter including a forming mold facing a forming surface of the blank; a motor configured to provide driving power; and an interlocking means engaged to the motor and configured to rectilinearly move the supporter in a direction perpendicular to a forming surface of the blank in conjunction with an operation of the motor.

The interlocking means may include: a plurality of jack nuts penetratively coupled to the supporter; guide screws fastened to the jack nuts by screw structures, provided to be rotatable about axes of the guide screws, and configured to move the supporter in an axial direction by rotating; and gear units engaged to the guide screws and configured to transmit the driving power of the motor to the guide screws.

The apparatus may further include holder guides configured to support rotations of the guide screws and disposed at respective corners of the blank holder to support the blank holder, in which the blank holder includes: a holder frame including a quadrangular frame shape including a hollow portion at a center portion of the holder frame, fixed to the holder guide, and including a rim on which a first surface of the blank is accommodated while covering the hollow portion; a gripper frame coupled to the holder frame while covering a rim portion of a second surface of the blank; and a variable gripper including two opposite end portions coupled to the holder frame and including a shape traversing the inside of the gripper frame while covering one side rim of the second surface of the blank.

The variable gripper may be coupled to the holder frame by moving in a direction perpendicular to a longitudinal direction thereof.

According to an exemplary embodiment of the present disclosure, the height of the blank may be automatically increased or decreased automatically in conjunction with the position of the forming robot through communication between the motor and the forming robot during the incremental forming. Therefore, the forming quality is maximized, the higher component formability is ensured, and the number of working processes is reduced.

Furthermore, when the incremental forming technology is applied to manufacture vehicle body components, the incremental forming technology may overcome limitations such as a situation in which complicated shapes cannot be implemented, restriction of materials, forming failures, and the like of the incremental forming technology in the related art. Therefore, the components having complicated shapes, made of various materials, and having various sizes may be manufactured to be applied to actual vehicles.

Furthermore, because the blank is fixed by adjusting the position of the variable gripper in accordance with the dimension of the blank, the blanks W with various dimensions may be fixed without manufacturing additional facilities. Furthermore, in a case in which a component, which does not have the standardized size, is manufactured in the future, only the tapped holes may be additionally formed to allow the component to have the required dimension and to be applied. Therefore, the single facility may manufacture the blanks having various sizes, which reduces the additional facility investment costs.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
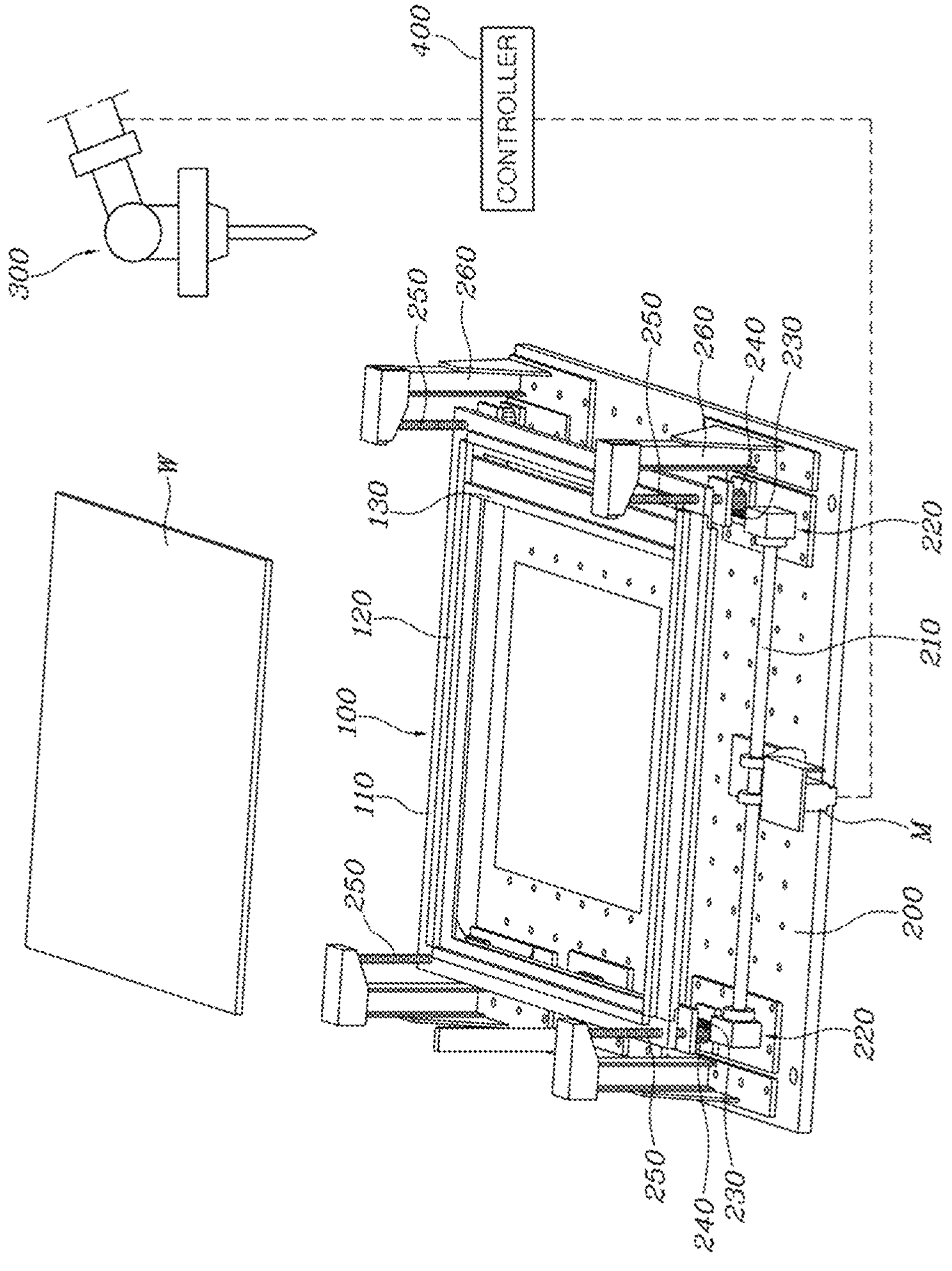
FIG. 1 is a view exemplarily illustrating an overall configuration of a blank holding apparatus according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, various exemplary embodiments of the present disclosure will be described in detail with reference to the accompanying drawings.

FIG. 1 is a view exemplarily illustrating an overall configuration of a blank holding apparatus according to an exemplary embodiment of the present disclosure.

Referring to the drawings, an apparatus of holding a blank for incremental forming according to various exemplary embodiments of the present disclosure may include a blank holder 100 to which a blank W is coupled; a motor M configured to provide driving power; an interlocking means engaged to the motor and configured to rectilinearly move the blank holder 100 in a direction perpendicular to a forming surface of the blank W in conjunction with an operation of the motor M; and a controller 400 configured to control the operation of the motor M so that the blank W rectilinearly moves in accordance with a position of a forming robot 300 for forming the blank W.

A base 200 has a quadrangular plate shape, and components, which form the motor M and the interlocking means, are provided on the base 200.

Furthermore, the blank W is coupled to the blank holder 100, and the blank holder 100 is provided above the base 200 so that the blank W is disposed at a position facing the base 200. The blank holder 100 is rectilinearly and reciprocatingly moved upward or downward by the interlocking means.

For reference, a component having a reference shape for forming the blank W may be separately attached to or detached from an upper surface of the base 200 that faces the blank W. The present component may be newly manufactured and assembled depending on a component to be formed.

Furthermore, an upper surface of the blank W is the forming surface. The forming robot 300 for incremental forming is positioned above the blank W, and a forming tool provided on the forming robot 300 processes the forming surface of the upper surface of the blank W.

In the instant case, the positions of the forming tool provided on the forming robot 300 may be obtained based on X, Y, and Z-axis coordinates of the forming robot 300. The obtained positions of the forming tool are considered as the positions of the forming robot 300 and transmitted to the controller 400.

Therefore, the controller 400 performs the incremental forming on the forming surface of the blank W while moving the blank holder 100 in the upward/downward direction by operating the motor M depending on the positions and velocities of the moving tool of the forming robot 300.

Therefore, during the incremental forming, the height of the blank W may be automatically increased or decreased automatically in conjunction with the position of the forming robot 300 through communication between the motor M and the forming robot 300. Therefore, the forming quality is maximized, the higher component formability is ensured, and the number of working processes is reduced.

Furthermore, when the incremental forming technology is applied to manufacture vehicle body components, the incremental forming technology may overcome limitations such as a situation in which complicated shapes cannot be implemented, restriction of materials, forming failures, and the like of the incremental forming technology in the related art. Therefore, the components having complicated shapes, made of various materials, and having various sizes may be manufactured to be applied to actual vehicles.

For reference, the controller 400 according to the exemplary embodiment of the present disclosure may be implemented by a non-volatile memory configured to algorithm for controlling operations of various constituent elements in a vehicle or store data related to software commands for executing the algorithm, and by a processor configured to perform the following operations by use of the data stored in the corresponding memory. In the instant case, the memory and the processor may be implemented as separate chips. Alternatively, the memory and the processor may be implemented as a single chip in which the memory and the processor are integrated. The processor may be configured in a form of one or more processors.

Figure 2:
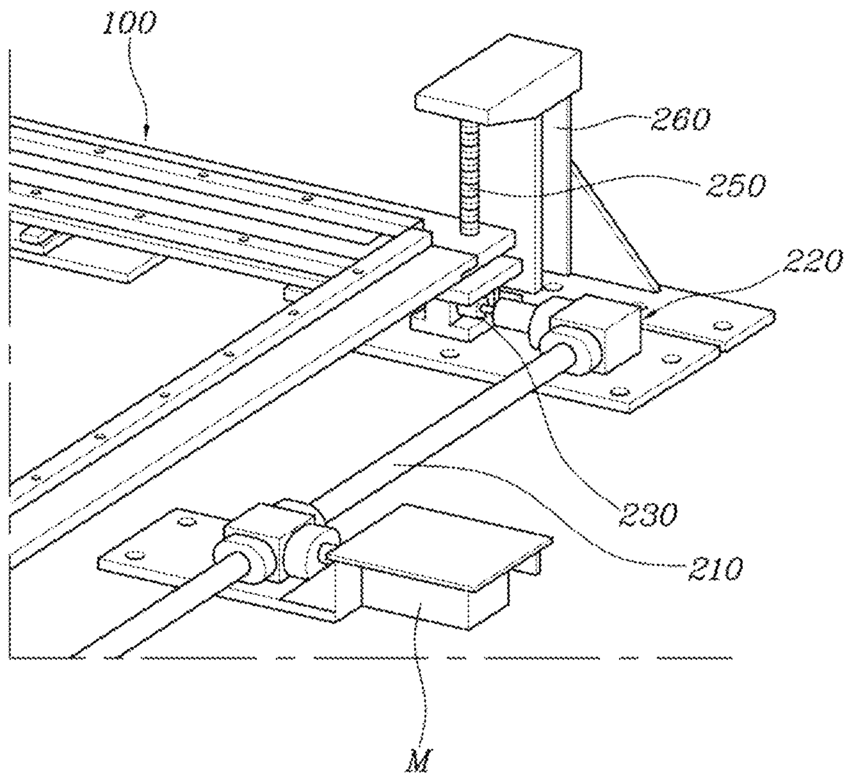
FIG. 2 is a view for explaining a configuration of an interlocking means according to an exemplary embodiment of the present disclosure.

Meanwhile, FIG. 2 is a view for explaining a configuration of an interlocking means according to an exemplary embodiment of the present disclosure.

Referring to FIG. 1 and FIG. 2, the interlocking means includes: a plurality of jack nuts 114 penetratively coupled to the blank holder 100; guide screws 250 fastened to the jack nuts 114 by screw structures, provided to be rotatable about axes of the guide screws, and configured to move the blank holder 100 in an axial direction by rotating; gear units configured to transmit driving power from the motor M to the guide screws 250.

Holder guides 260 are provided in a vertical longitudinal direction thereof and disposed at respective corners of an upper surface of the base 200.

Furthermore, the guide screw 250 is provided in the vertical longitudinal direction. An upper end portion of the guide screw 250 is rotatably supported on an upper end portion of the holder guide 260, and a lower end portion of the guide screw 250 is rotatably supported on an upper surface of the base 200 so that an axial motion of the guide screw 250 is restricted, but only a rotation of the guide screw 250 is permitted between the holder guide 260 and the base 200.

Furthermore, the jack nuts 114 are fixed to the respective corners of the blank holder 100, and the guide screw 250 is thread-fastened in the jack nut 114.

Therefore, when the driving power of the motor M is transmitted to the guide screw 250 and the guide screw 250 rotates in one direction, the screw fastening structure between the jack nut 114 and the guide screw 250 converts the rotational motion of the guide screw 250 into the rectilinear motion of the jack nut 114. Therefore, the jack nut 114 moves upward along the guide screw 250, raising the blank holder 100 and increasing the height of the blank W.

On the other hand, when the guide screw 250 rotates in the other direction, the jack nut 114 moves downward along the guide screw 250, lowering the blank holder 100 and decreasing the height of the blank W.

Therefore, the vertical height of the blank W is adjusted by operating the motor M depending on the position of the forming robot 300 so that the forming quality of the blank W is improved, and the number of working processes is reduced.

Figure 3:
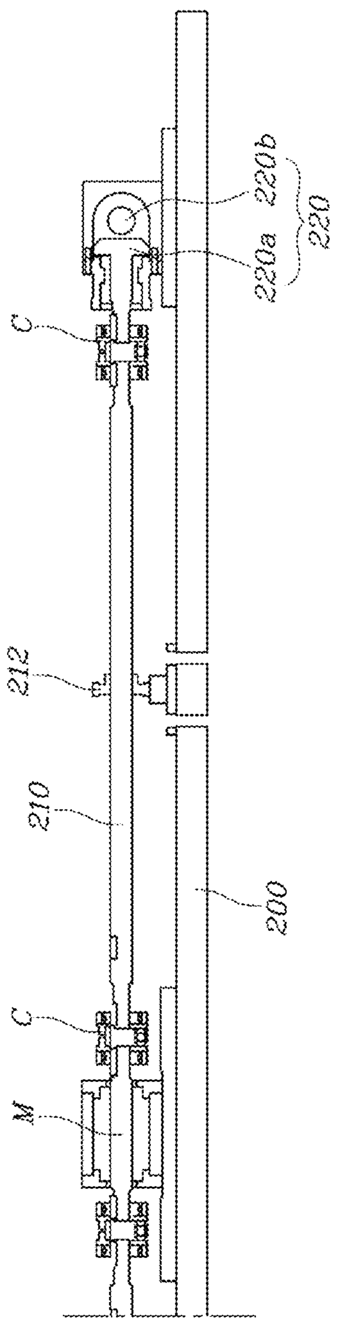
FIG. 3 is a partially cut-away view exemplarily illustrating a front shape of the blank holding apparatus according to an exemplary embodiment of the present disclosure.
Figure 4:
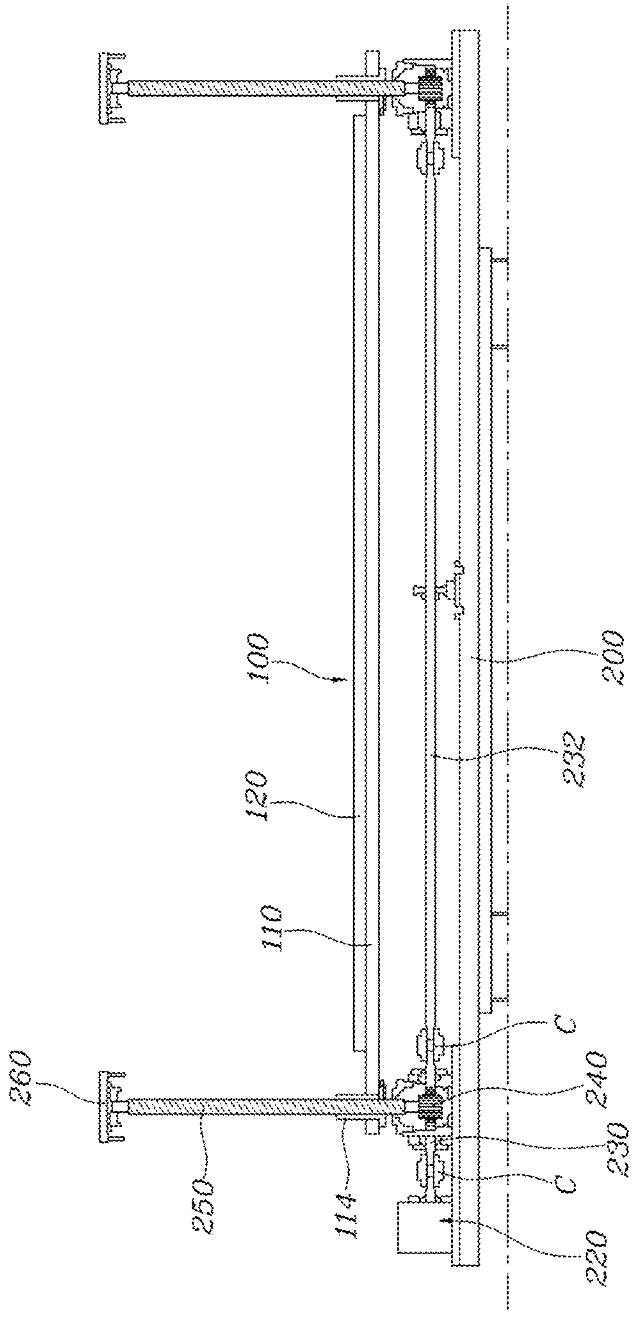
FIG. 4 is a partially cut-away view exemplarily illustrating a lateral shape of the blank holding apparatus according to an exemplary embodiment of the present disclosure.

Furthermore, FIG. 3 is a partially cut-away view of a front shape of the blank holding apparatus according to an exemplary embodiment of the present disclosure, and FIG. 4 is a partially cut-away view of a lateral shape of the blank holding apparatus according to an exemplary embodiment of the present disclosure. According to an exemplary embodiment of the present disclosure, the driving power of the motor M is transmitted to the guide screw 250 through the gear unit.

Referring to the drawings, the gear unit includes: a worm wheel 240 fixed to an end portion of the guide screw 250 and configured to rotate about an axis thereof; and a worm 230 configured to receive the driving power from the motor M and engage with the worm wheel 240 to rotate the worm wheel 240.

For example, the worm wheel 240 is fixed to the lower end portion of the guide screw 250 to be coaxial with the guide screw 250, the worm 230 engages with the worm wheel 240, and the driving power of the motor M is transmitted to the worm 230.

Therefore, when the driving power of the motor M is transmitted to the worm 230 and the worm 230 rotates, the worm wheel 240 engaging with the worm 230 rotates so that the guide screw 250 fixed to the worm wheel 240 rotates.

Furthermore, according to an exemplary embodiment of the present disclosure, the worms 230 for transmitting the rotational force to the guide screws 250 are disposed at two opposite sides of the blank holder 100, and driveshafts 210 are disposed at two opposite sides of the motor M. The driveshafts 210 and the worms 230 disposed at the two opposite sides are connected to one another by a bevel gear set 220 so that the driving power of the motor M are equally transmitted to the worms 230 at the two opposite sides.

Referring to FIGS. 1, 3, and 4, the motor M is provided on the base 200, and the driveshafts 210 are respectively connected to one side and the other side of a shaft of the motor M so that the driving power of the motor M is transmitted to the driveshafts 210 at two opposite sides.

Furthermore, first bevel gears 220*a* are disposed at end portions of the driveshafts 210 at the two opposite sides, which face the worms 230, and second bevel gears 220*b*, which engage with the first bevel gears 220*a*, are disposed at end portions of the worms 230 so that the driving power of the motor M is converted in a direction of 90° through the bevel gear set 220 and transmitted to the worms 230.

For reference, although not illustrated in the drawings, the shaft of the motor M and the driveshaft 210 are also connected by the bevel gear set 220.

Furthermore, the shaft of the motor M and the driveshaft 210 are directly connected by a coupling C, and the driveshaft 210 and the bevel gear set 220 are also directly and mechanically by the coupling C so that the motor M and the driveshaft 210 and the first bevel gear 220*a* at the two opposite sides rotate at the same speed.

Furthermore, a bearing 212 is provided at a middle portion of the driveshaft 210 to prevent the driveshaft 210 from being bent due to a high-speed rotation, and only the rotation of the driveshaft 210 is permitted by the bearing 212.

That is, because the driving power of the motor M is equally transmitted to the left and right gear units through the driveshafts 210 at the two opposite sides. Therefore, even in the case in which the single motor M is applied, the blank holder 100 moves upward or downward in a state in which a degree of parallelization of the blank holder 100 is constantly maintained so that the upward and downward movements of the blank holder 100 are stably performed.

Furthermore, the bevel gear set 220 may define a reduction gear ratio which is more than one.

That is, the bevel gear set 220 is configured as a speed reducer for adjusting a final rotation speed compared to a velocity of the motor M using a gear ratio between the first bevel gear 220*a* and the second bevel gear 220*b*, obtaining a final output higher than a maximum output of the motor M.

Furthermore, referring to FIGS. 1 and 4, the blank holder 100 has a quadrangular shape, the worms 230 are provided at the respective corners of the blank holder 100, and the worm 230 at the front end portion and the worm 230 at the rear end portion are connected by a connection shaft 232 so that the driving power of the motor M is equally transmitted to the respective worms 230.

For example, the blank holder 100 has a rectangular shape, and the guide screws 250 are provided at the corners of the blank holder 100 so that the worm wheels 240 and the worms 230 are provided corresponding to the respective guide screws 250.

That is, the worms 230 are provided at front and rear end portions at the left and right sides of the base 200, the worm 230 at the front end portion thereof is directly connected to the bevel gear set 220, the worm 230 at the front end portion and the worm 230 at the rear end portion are connected by the connection shaft 232 so that the driving power generated by the motor M is transmitted to the worm 230 at the rear end portion through the connection shaft 232.

For reference, the worm 230 at the front end portion and the connection shaft 232 are directly connected by the coupling C, and the worm 230 at the rear end portion and the connection shaft 232 are also mechanically or directly connected by the coupling C so that the worm 230 at the front end portion and the worm 230 at the rear end portion rotate at the same velocity.

Furthermore, a bearing (no reference numeral) is also provided at the middle portion of the connection shaft 232, and the rotation of the connection shaft 232 is supported by the bearing.

Furthermore, the configuration in which the components for moving the blank holder 100 upward or downward at the left and right sides of the blank holder 100 by the operation of the motor M are symmetrically provided at the left and right sides are illustrated. However, the components may not be symmetrically disposed as long as the driving power of the motor M is equally provided to the left and right sides of the blank holder 100.

That is, because the driving power of the motor M is equally transmitted that front and rear guide screws 250 through the connection shaft 232, the blank holder 100 moves upward or downward in the state in which the degree of parallelization of the blank holder 100 is constantly maintained so that the upward and downward movements of the blank holder 100 is stably performed.

Figure 5:
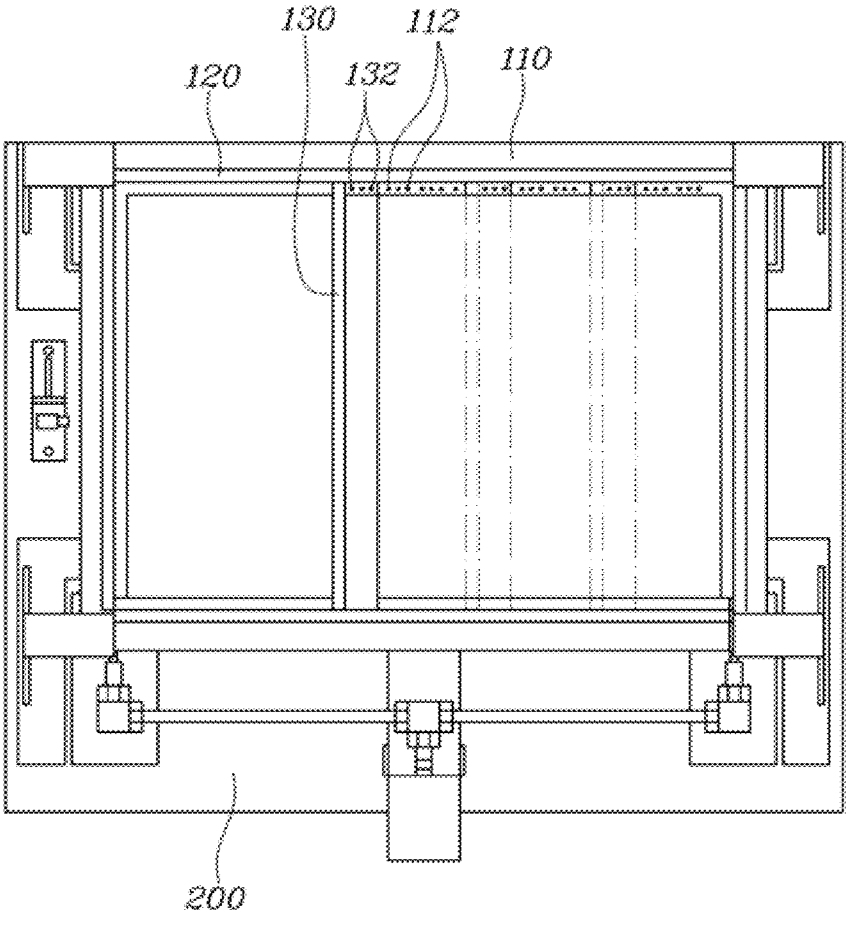
FIG. 5 is a view exemplarily illustrating a state in which a position of a variable gripper provided on a blank holder according to an exemplary embodiment of the present disclosure is changed.

Meanwhile, FIG. 5 is a view exemplarily illustrating a state in which a position of a variable gripper 130 provided on the blank holder 100 according to an exemplary embodiment of the present disclosure is changed. According to an exemplary embodiment of the present disclosure, the blank W may be coupled to the blank holder 100 after the position of the blank W is changed.

Referring to the drawings, the blank holder 100 includes: a holder frame 110 fixed to the jack nuts 114, having a quadrangular frame shape having a hollow portion at a center portion of the holder frame, and having a rim on which one surface of the blank W is accommodated while covering the hollow portion; a gripper frame 120 coupled to the holder frame 110 while covering a rim portion of the other surface of the blank W; and a variable gripper 130 having a shape traversing the inside of the gripper frame 120 and having two opposite end portions coupled to the holder frame 110 while covering one side rim of the other surface of the blank W.

The variable gripper 130 may be coupled to the holder frame 110 by moving in a direction perpendicular to the longitudinal direction thereof.

For example, the blank W, which is made of steel and required to be formed, is placed on the upper surface of the rim portion of the holder frame 110. Furthermore, the blank W is fixed by fastening the blank W and the holder frame 110 by bolting through the gripper frame 120 in the state in which the gripper frame 120 is accommodated on the rim portion of the blank W.

However, in a case in which a dimension of the blank W is changed, the position of the variable gripper 130 is moved to the left and right so that the variable gripper 130 supports one surface of the blank W depending on the dimension of the blank W.

In the instant case, a plurality of tapped holes 112 is formed along an internal rim of the upper surface of the holder frame 110, and fastening holes 132 corresponding to the tapped holes 112 are formed in the variable gripper 130 so that the blank W is fixed by fastening the blank W and the holder frame 110 by bolting through the variable gripper 130.

Therefore, because the blank W is fixed by adjusting the position of the variable gripper 130 depending on the dimension of the blank W, the blanks W with various dimensions may be fixed without manufacturing additional facilities. Furthermore, in a case in which a component, which does not have the standardized size, is manufactured in the future, only the tapped holes 112 may be additionally formed to allow the component to have the required dimension and to be applied. Therefore, the single facility may manufacture the blanks W having various sizes, which reduces the additional facility investment costs.

Figure 6:
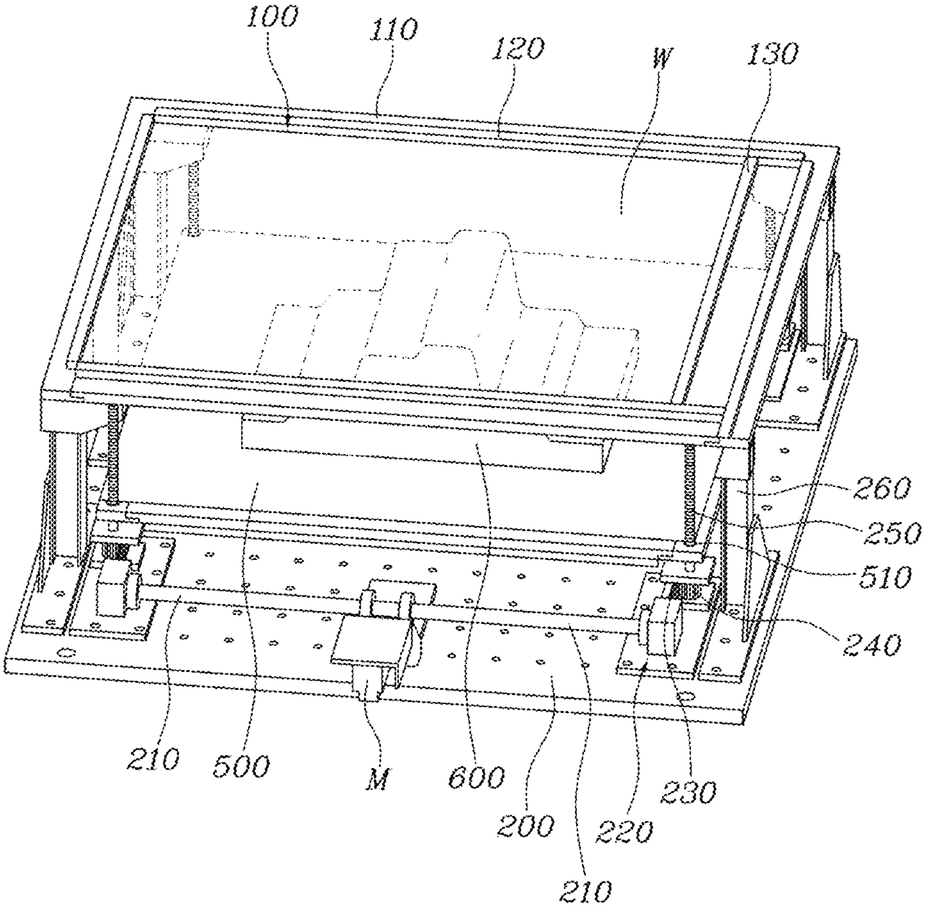
FIG. 6 is a view exemplarily illustrating an overall configuration of another exemplary embodiment of the blank holding apparatus according to an exemplary embodiment of the present disclosure.

Meanwhile, FIG. 6 is a view exemplarily illustrating an overall configuration of another exemplary embodiment of the blank holding apparatus according to an exemplary embodiment of the present disclosure. The blank W may be formed by moving the forming mold 600 toward the blank W coupled to the blank holder 100 in the state in which the blank holder 100 is fixed.

Referring to the drawings, the apparatus of holding a blank for incremental forming according to various exemplary embodiments of the present disclosure may include the blank holder 100 to which the blank W is coupled; a supporter 500 including a forming mold 600 facing the forming surface of the blank W; the motor M configured to provide the driving power; and an interlocking means engaged to the motor and configured to rectilinearly move the supporter 500 in the direction perpendicular to the forming surface of the blank W in conjunction with the operation of the motor M.

The base 200 has a quadrangular plate shape, and components, which form the motor M and the interlocking means, are provided on the base 200.

Furthermore, the forming mold 600 is coupled to an upper surface of the supporter 500, the supporter 500 is provided on an upper portion of the base 200, the forming mold 600 is provided at a position facing the base 200, and the supporter 500 is rectilinearly and reciprocatingly moved upward or downward by the interlocking means.

Therefore, during the incremental forming, the blank W is formed by automatically increasing or decreasing the height of the forming mold 600 provided on the supporter 500 so that the forming quality is improved, the component formability is ensured, and the number of working processes is reduced.

Furthermore, when the incremental forming technology is applied to manufacture vehicle body components, the incremental forming technology may overcome limitations such as a situation in which complicated shapes cannot be implemented, restriction of materials, forming failures, and the like of the incremental forming technology in the related art. Therefore, the components having complicated shapes, made of various materials, and having various sizes may be manufactured to be applied to actual vehicles.

For reference, the method of moving the forming mold 600 upward or downward significantly increases a movement weight compared to the method of moving the blank holder 100. Therefore, the motor M with increased output may be used. In the instant case, because the power transmitted through the motor M is increased, the components forming the interlocking means need to withstand the increased input and output.

Meanwhile, the interlocking means includes: a plurality of jack nuts 510 penetratively coupled to the supporter 500; guide screws 250 fastened to the jack nuts 510 by screw structures, provided to be rotatable about axes of the guide screws, and configured to move the supporter 500 in an axial direction by rotating; the gear units configured to transmit driving power of the motor M to the guide screws 250.

The holder guides 260 are provided in the vertical longitudinal direction thereof and disposed at the respective corners of the upper surface of the base 200.

Furthermore, the guide screw 250 is provided in the vertical longitudinal direction thereof. The upper end portion of the guide screw 250 is rotatably supported on the upper end portion of the holder guide 260, and the lower end portion of the guide screw 250 is rotatably supported on the upper surface of the base 200 so that the axial motion of the guide screw 250 is restricted, but only the rotation of the guide screw 250 is permitted between the holder guide 260 and the base 200.

Furthermore, the jack nuts 510 are fixed to the respective corners of the supporter 500, and the guide screw 250 is thread-fastened in the jack nut 510.

Therefore, when the driving power of the motor M is transmitted to the guide screw 250 and the guide screw 250 rotates in one direction, the screw fastening structure between the jack nut 510 and the guide screw 250 converts the rotational motion of the guide screw 250 into the rectilinear motion of the jack nut 510. Therefore, the jack nut 510 moves upward along the guide screw 250, raising the supporter 500 and increasing the height of the forming mold 600.

On the other hand, when the guide screw 250 rotates in the other direction, the jack nut 510 moves downward along the guide screw 250, lowering the supporter 500 and decreasing the height of the forming mold 600.

Furthermore, in the blank holding apparatus illustrated in FIG. 6, the gear unit includes: the worm wheel 240 fixed to the end portion of the guide screw 250 and configured to rotate about the axis thereof; and the worm 230 configured to receive the driving power from the motor M and engage with the worm wheel 240 to rotate the worm wheel 240.

Furthermore, the worms 230 for transmitting the rotational force to the guide screws 250 are disposed at the two opposite sides of the supporter 500, and the driveshafts 210 are disposed at the two opposite sides of the motor M. The driveshafts 210 and the worms 230 disposed at the two opposite sides are connected to one another by the bevel gear set 220 so that the driving power of the motor M is equally transmitted to the worms 230 at the two opposite sides.

Furthermore, the supporter 500 has a quadrangular shape, the worms 230 are provided at the respective corners of the supporter 500, and the worm 230 at the front end portion and the worm 230 at the rear end portion are connected by mean the connection shaft 232 so that the driving power of the motor M is equally transmitted to the respective worms 230.

Furthermore, the bevel gear set 220 defines a reduction gear ratio which is more than one.

That is, the components illustrated in FIG. 6, including the gear unit, and connected between the motor M and the supporter 500 to raise or lower the supporter 500 is substantially identical to the components (including the gear unit) illustrated in FIG. 1 and connected between the motor M and the blank holder 100 to raise or lower the blank holder 100. However, there is a difference in that the supporter 500 illustrated in FIG. 6 is raised or lowered instead of the blank holder 100.

Therefore, the description of the configuration and operation for transmitting the driving power from the motor M to the supporter 500 will be omitted.

Meanwhile, the blank holding apparatus illustrated in FIG. 6 further includes the holder guides 260 configured to support the rotations of the guide screws 250 and disposed at the respective corners of the blank holder 100 to support the blank holder 100.

Furthermore, the blank holder 100 includes: the holder frame 110 having a quadrangular frame shape having the hollow portion at a center portion of the holder frame, fixed to the holder guide 260, and having the rim on which one surface of the blank W is accommodated while covering the hollow portion; the gripper frame 120 coupled to the holder frame 110 while covering the rim portion of the other surface of the blank W; and the variable gripper 130 having the two opposite end portions coupled to the holder frame 110 and having a shape traversing the inside of the gripper frame 120 while covering one side rim of the other surface of the blank W.

The variable gripper 130 may be coupled to the holder frame 110 by moving in the direction perpendicular to the longitudinal direction thereof.

For example, the bottom surfaces of the respective corners of the holder frame 110 are fixed to the top surface of the holder guide 260.

The blank W, which is made of steel and required to be formed, is placed on the upper surface of the rim portion of the holder frame 110. Furthermore, the blank W is fixed by fastening the blank W and the holder frame 110 by bolting through the gripper frame 120 in the state in which the gripper frame 120 is accommodated on the rim portion of the blank W.

However, in a case in which a dimension of the blank W is changed, the position of the variable gripper 130 is moved to the left and right so that the variable gripper 130 supports one surface of the blank W depending on the dimension of the blank W.

In the instant case, a plurality of tapped holes 112 is formed along an internal rim of the upper surface of the holder frame 110, and fastening holes 132 corresponding to the tapped holes 112 are formed in the variable gripper 130 so that the blank W is fixed by fastening the blank W and the holder frame 110 by bolting through the variable gripper 130.

Therefore, because the blank W is fixed by adjusting the position of the variable gripper 130 depending on the dimension of the blank W, the blanks W with various dimensions may be fixed without manufacturing additional facilities. Furthermore, in a case in which a component, which does not have the standardized size, is manufactured in the future, only the tapped holes 112 may be additionally formed to allow the component to have the required dimension and to be applied. Therefore, the single facility may manufacture the blanks W having various sizes, which reduces the additional facility investment costs.

Hereinafter, a process of operating the blank holding apparatus will be described with reference to FIG. 1.

First, the blank W required to be processed is placed on the holder frame 110 forming the blank holder 100, and then the gripper frame 120 and the holder frame are fastened by bolting through the blank W in the state in which the gripper frame 120 is accommodated on the blank W.

Furthermore, the blank W is fixed to the blank holder 100 by fastening the variable gripper 130 to the holder frame by bolting in accordance with the dimension of the blank W.

Thereafter, the forming surface of the blank W is processed by the operation of the forming robot 300.

When the position of the forming robot 300 is transmitted to the controller 400 in real time during the forming process, the controller 400 operates the motor M in accordance with the positions and velocities of the forming robot 300 and processes the blank W while moving the blank holder 100 upward or downward.

That is, when the blank W is required to be moved upward or downward, the motor M operates forward or reversely.

Therefore, the driveshaft 210 rotates as the driving power of the motor M is transmitted to the driveshaft 210. The driving power transmitted to the driveshaft 210 is transmitted to the first bevel gear 220*a* and the second bevel gear 220*b* of the bevel gear set 220 and converted in the rotation direction bent by 90°.

Furthermore, as the driving power is transmitted to the worm 230 directly connected to the second bevel gear 220*b*, the worm 230 rotates, and the worm wheel 240 engaging with the worm 230 rotates.

In the instant case, the driving power transmitted from the second bevel gear 220*b* to the worm 230 is also transmitted to the worm 230 at the rear end portion through the connection shaft 232 so that the worms 230 provided at the respective corners rotate at the same rotation speed.

Furthermore, because the worm wheel 240 is fixed to the lower end portion of the guide screw 250, the guide screw 250 rotates together with the worm wheel 240.

Therefore, when the guide screw 250 rotates, the screw fastening structure between the jack nut 114 and the guide screw 250 converts the rotational motion of the guide screw 250 into the rectilinear motion of the jack nut 114. Therefore, the jack nut 114 moves upward or downward along the guide screw 250, raising or lowering the blank holder 100 and increasing or decreasing the height of the blank W.

As described above, according to an exemplary embodiment of the present disclosure, the height of the blank W may be automatically increased or decreased automatically in conjunction with the position of the forming robot 300 through communication between the motor M and the forming robot 300 during the incremental forming. Therefore, the forming quality is maximized, the higher component formability is ensured, and the number of working processes is reduced.

The aforementioned invention can also be embodied as computer readable codes on a computer readable recording medium. The computer readable recording medium is any data storage device that can store data which may be thereafter read by a computer system and store and execute program instructions which may be thereafter read by a computer system. Examples of the computer readable recording medium include Hard Disk Drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet). Examples of the program instruction include machine language code such as those generated by a compiler, as well as high-level language code which may be executed by a computer using an interpreter or the like.

In various exemplary embodiments of the present disclosure, each operation described above may be performed by a control device, and the control device may be configured by a plurality of control devices, or an integrated single control device.

In various exemplary embodiments of the present disclosure, the control device may be implemented in a form of hardware or software, or may be implemented in a combination of hardware and software.

Furthermore, the terms such as "unit", "module", etc. Included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. An apparatus of holding a blank for incremental forming, the apparatus comprising:

a blank holder to which the blank is configured to be coupled;

a motor configured to provide driving power;

an interlocking means engaged to the motor and configured to rectilinearly move the blank holder in a direction perpendicular to a forming surface of the blank in conjunction with an operation of the motor; and a controller configured to control the operation of the motor so that the blank rectilinearly moves depending on a position of a forming robot configured for forming the blank.

2. The apparatus of claim 1, wherein the interlocking means includes:

a plurality of jack nuts penetratively coupled to the blank holder;

guide screws fastened to the jack nuts by screw structures, provided to be rotatable about axes of the guide screws, and configured to move the blank holder in an axial direction by rotating; and gear units engaged to the guide screws and configured to transmit the driving power of the motor to the guide screws.

3. The apparatus of claim 2, wherein each of the gear units includes:

a worm wheel fixed to an end portion of a corresponding guide screw and configured to rotate about an axis thereof; and a worm configured to receive the driving power from the motor and engage with the worm wheel to rotate the worm wheel.

4. The apparatus of claim 3, wherein the worms for transmitting a rotational force to the guide screws are disposed at first and second opposite sides of the blank holder, driveshafts are disposed at first and second opposite sides of the motor, and the driveshafts and the worms are connected to one another by a bevel gear set so that the driving power of the motor is equally transmitted to the worms at the first and second opposite sides of the motor.

5. The apparatus of claim 4, wherein the blank holder has a quadrangular shape, the worms are provided at respective corners of the blank holder, and a worm at a front end portion of the blank holder among the worms and a worm at a rear end portion of the blank holder among the worms are connected by a connection shaft so that the driving power of the motor is equally transmitted to the respective worms.

6. The apparatus of claim 4, wherein the bevel gear set defines a reduction gear ratio which is more than one.

7. The apparatus of claim 2, wherein the blank holder includes:

a holder frame fixed to the jack nuts, having a quadrangular frame shape having a hollow portion at a center portion of the holder frame, and having a rim on which a first surface of the blank is accommodated while covering the hollow portion;

a gripper frame coupled to the holder frame while covering a rim portion of a second surface of the blank; and a variable gripper having a shape traversing the inside of the gripper frame and having first and second opposite end portions coupled to the holder frame while covering one side rim of the second surface of the blank.

8. The apparatus of claim 7, wherein the variable gripper is coupled to the holder frame by moving in a direction perpendicular to a longitudinal direction thereof.

9. The apparatus of claim 7, wherein a plurality of tapped holes is formed along an internal rim of an upper surface of the holder frame, and fastening holes corresponding to the tapped holes are formed in the variable gripper so that the blank is fixed by fastening the blank and the holder frame by bolting through the variable gripper.

10. An apparatus of holding a blank for incremental forming, the apparatus comprising:

a blank holder to which the blank is configured to be coupled;

a supporter including a forming mold facing a forming surface of the blank;

a motor configured to provide driving power; and an interlocking means engaged to the motor and configured to rectilinearly move the supporter in a direction perpendicular to a forming surface of the blank in conjunction with an operation of the motor.

11. The apparatus of claim 10, wherein the interlocking means includes:

a plurality of jack nuts penetratively coupled to the supporter;

guide screws fastened to the jack nuts by screw structures, provided to be rotatable about axes of the guide screws, and configured to move the supporter in an axial direction by rotating; and gear units engaged to the guide screws and configured to transmit the driving power of the motor to the guide screws.

12. The apparatus of claim 11, further including:

holder guides configured to support rotations of the guide screws and disposed at respective corners of the blank holder to support the blank holder, wherein the blank holder includes:

a holder frame having a quadrangular frame shape having a hollow portion at a center portion of the holder frame, fixed to the holder guide, and having a rim on which a first surface of the blank is accommodated while covering the hollow portion;

a gripper frame coupled to the holder frame while covering a rim portion of a second surface of the blank; and a variable gripper having first and second opposite end portions coupled to the holder frame and having a shape traversing the inside of the gripper frame while covering one side rim of the second surface of the blank.

13. The apparatus of claim 12, wherein the variable gripper is coupled to the holder frame by moving in a direction perpendicular to a longitudinal direction thereof.

14. The apparatus of claim 12, wherein a plurality of tapped holes is formed along an internal rim of an upper surface of the holder frame, and fastening holes corresponding to the tapped holes are formed in the variable gripper so that the blank is fixed by fastening the blank and the holder frame by bolting through the variable gripper.

* * * * *